United States Patent
Raake et al.

(10) Patent No.: US 9,232,216 B2
(45) Date of Patent: Jan. 5, 2016

(54) METHOD AND APPARATUS FOR ASSESSING THE QUALITY OF A VIDEO SIGNAL DURING ENCODING AND TRANSMISSION OF THE VIDEO SIGNAL

(75) Inventors: Alexander Raake, Berlin (DE); Marie-Neige Garcia, Berlin (DE); Peter List, Eppertshausen (DE); Savvas Argyropoulos, Berlin (DE); Bernhard Feiten, Berlin (DE)

(73) Assignee: DEUTSCHE TELEKOM AG, Bonn (DE)

( * ) Notice: Subject to any disclaimer, the term of this patent is extended or adjusted under 35 U.S.C. 154(b) by 338 days.

(21) Appl. No.: 13/991,665

(22) PCT Filed: Sep. 2, 2011

(86) PCT No.: PCT/EP2011/065188
§ 371 (c)(1),
(2), (4) Date: Jun. 25, 2013

(87) PCT Pub. No.: WO2012/076202
PCT Pub. Date: Jun. 14, 2012

(65) Prior Publication Data
US 2013/0265445 A1    Oct. 10, 2013

(30) Foreign Application Priority Data
Dec. 10, 2010  (EP) .................................... 10194578

(51) Int. Cl.
*H04N 17/00* (2006.01)
*H04N 21/442* (2011.01)
*H04N 21/4425* (2011.01)

(52) U.S. Cl.
CPC ......... *H04N 17/004* (2013.01); *H04N 21/4425* (2013.01); *H04N 21/44209* (2013.01)

(58) Field of Classification Search
CPC .......... H04N 17/004; H04N 21/44209; H04N 21/4425
See application file for complete search history.

(56) References Cited

U.S. PATENT DOCUMENTS

2007/0047640 A1*  3/2007  Venna et al. ............. 375/240.01
2007/0153916 A1*  7/2007  Demircin et al. ........ 375/240.26
(Continued)

FOREIGN PATENT DOCUMENTS

EP    1727375 A1    11/2006
EP    2106153 A1    9/2009
(Continued)

OTHER PUBLICATIONS

A. Takahashi, D. Hands, and V. Barriac, "Standardization Activities in the ITU for a QoE Assessment of IPTV," in IEEE Communication Magazine, Dec. 2008.
(Continued)

*Primary Examiner* — Jay Patel
*Assistant Examiner* — Joseph Suh
(74) *Attorney, Agent, or Firm* — Leydig, Voit & Mayer, Ltd.

(57) ABSTRACT

A method for assessing the quality of a transmitted video signal sequence at the receiver side includes the steps of: capturing the received input video bit stream prior to decoding and supplying it to a video bit stream analyzer; extracting, during a measurement time window, one or more features from the captured packet headers by the bit stream analyzer, without analyzing or decoding the packet payload; computing from the one or more features, a single parameter, xwpSEQ, representing an estimate of the spatio-temporal extent of the signal degradation due to packet-loss; supplying the determined parameter to a quality estimation module; and calculating, by the quality estimation module, a quality measure due to packet loss ($Q_{trans}$) based on the single parameter representing the estimate of the spatio-temporal extent of the signal degradation, xwpSEQ, due to packet-loss and based on video resolution information and employed video codec.

20 Claims, 5 Drawing Sheets

(56) References Cited

U.S. PATENT DOCUMENTS

| | | | |
|---|---|---|---|
| 2007/0201388 A1* | 8/2007 | Shah et al. | 370/300 |
| 2007/0237227 A1* | 10/2007 | Yang et al. | 375/240.12 |
| 2007/0268836 A1* | 11/2007 | Byun et al. | 370/252 |
| 2010/0110199 A1 | 5/2010 | Winkler et al. | |
| 2010/0166388 A1* | 7/2010 | Ushiki | 386/95 |
| 2010/0316066 A1* | 12/2010 | Leung | 370/468 |
| 2011/0249127 A1* | 10/2011 | Zhang et al. | 348/192 |
| 2012/0020415 A1* | 1/2012 | Yang et al. | 375/240.27 |
| 2012/0201310 A1* | 8/2012 | Yamagishi et al. | 375/240.27 |
| 2013/0208814 A1* | 8/2013 | Argyropoulos et al. | 375/240.27 |

FOREIGN PATENT DOCUMENTS

| | | |
|---|---|---|
| EP | 2229001 A1 | 9/2010 |
| JP | 2006033722 A | 2/2006 |
| JP | 2008301026 A | 12/2008 |
| JP | 2009273010 A | 11/2009 |
| JP | 2010011112 A | 1/2010 |
| WO | 2010051834 A1 | 5/2010 |
| WO | WO 2012013655 A1 | 2/2012 |

OTHER PUBLICATIONS

S. Winkler and P. Mohandas, "The Evolution of Video Quality Measurement: From PSNR to Hybrid Metrics," in IEEE Trans. Broadcasting, Dec. 2008.

A. Raake, M.N. Garcia, S. Moeller, J. Berger, F. Kling, P. List, J. Johann, and C. Heidemann, "T-V-MODEL: Parameter-based prediction of IPTV quality," in Proc. of ICASSP, Dec. 2008.

O. Verscheure, P. Frossard and M. Hamdi "User-Oriented QoS Analysis in MPEG-2 Video Delivery", in Real-Time Imaging 5, 305-314 (Dec. 1999).

F. You, W. Zhang, J. Xiao, "Packet Loss Patern and Parametric Video Quality Model for IPTV", in Proc. of Eight IEEE/ACIS International Conference on Computer and Information Science, pp. 824-828, Dec. 2009.

M.-N. Garcia and A. Raake, "Parametric Packet-Layer Video Quality Model for IPTV", in Proc. of Tenth International Conference on Information Science, Signal Processing and their Applications (ISSPA) 2010.

K. Yamagishi and T. Hayashi, "Parametric Packet-Layer Model for Monitoring Video Quality of IPTV Services," IEEE ICC 2008, CQ04-3, pp. 110-114, Beijing, China, Dec. 2008.

P. Frossard, O. Verscheure, Joint Sourc/FEC Rate Selection for Quality-optimal MPEG-2 Video Delivery. IEEE Trans. Image Proc., vol. 10, No. 12, Dec. 2001.

Jixian Yao et al: "No-Reference Objective Quality Assessment for Video Communication Services Based on Feature Extraction," Image and Signal Processing, 2009. CISP '09. 2nd International Congress on, IEEE, Piscataway, NJ, USA, Oct. 17, 2009, pp. 1-6, XP031556064, ISBN: 978-1-4244-4129-7.

Dong Li; Meilin Cai: "A Video Quality-Estimation Model for Streaming Media Services Based on Human Visual System," Computational Intelligence and Software Engineering, 2009. CiSE 2009. IEEE, Piscataway, NJ, USA, Dec. 11, 2009, pp. 1-4, XP031588511, ISBN 978-1-4244-4507-3.

Ning Liao; Zhibo Chen: "A packet-layer video quality assessment model based on spatiotemporal complexity estimation," Visual Communications and Image Processing; Huang Shan, An Hui, China, Nov. 11, 2010, pp. 110, XP030082205.

* cited by examiner

Encoded-Order

Display-Order (a) Loss propagation without loss attenuation or expansion (b) Loss propagation with loss attenuation (c) Loss propagation with loss expansion

METHOD AND APPARATUS FOR ASSESSING THE QUALITY OF A VIDEO SIGNAL DURING ENCODING AND TRANSMISSION OF THE VIDEO SIGNAL

CROSS-REFERENCE TO RELATED APPLICATIONS

This application is a U.S. National Phase application under 35 U.S.C. §371 of International Application No. PCT/EP2011/065188, filed on Sep. 2, 2011, and claims benefit to European Patent Application No. EP 10194578.0, filed on Dec. 10, 2010. The International Application was published in English on Jun. 14, 2012 as WO 2012/076202 A1 under PCT Article 21(2).

FIELD

The invention relates to a method and apparatus for assessing the quality of a video signal as it results after encoding, transmission and decoding of the video signal. The invention focuses in particular on the assessment and modelling of the perceived quality of the video signal in case that the video signal is impaired by packet loss during transmission.

BACKGROUND

Among the numerous video distribution services, IP-based video as it is used, for example, for IPTV (Internet protocol TV) is becoming increasingly important, and is more and more replacing analogue or non packet-based transmission methods. It is a major responsibility of the broadcast provider towards both content provider and customer to maintain a high level of quality of its service. In large-scale video distribution networks as they are involved, for example, in IPTV services only fully automated quality monitoring probes can fulfil this requirement.

In order to achieve a high degree of satisfaction of the user of video services such as non-interactive streaming video (IPTV, VoD) or static video (DVD), besides technical performance indicators such monitoring probes need to also provide estimates of video quality that the users of the services perceive during a given monitoring interval.

To this aim, technical video quality models are developed which provide instrumental estimates of the video quality as perceived by the user, and thus are technical models of the user. For instance, those models can output the degree of similarity between the video received at the user side and the original, non-degraded video. In addition, representing a more sophisticated solution, the Human Visual System (HVS) can be modelled using a technical system. At last, such a model shall provide quality estimates that correspond to ratings given by users, which is achieved by training the technical models on the results of extensive subjective quality tests.

Video quality models and thus measurement systems are generally classified as follow:

Quality Model Types
　Full Reference (FR): a reference signal is required.
　Reduced-Reference (RR): partial information extracted from the source signal is required.
　No-Reference (NR): no reference signal is required.

Input Parameter Types
　signal/media-based: the decoded image (pixel-information) is required.
　parameter-based: bitstream-level information is required. Information can range from packet-header information, requiring parsing of the packet-headers only, over partial to full decoding of the bitstream.

Type of Application
　Network Planning: the model or measurement system is used before the implementation of the service in the planning phase, in order to identify the best possible implementation.
　Service Monitoring: the model is used during service operation.

Related information of the types of video quality models can be found in references [1], [2], or [3].

In the context of IPTV, main distortions are caused by video compression and video packet loss. Elements influencing the perceived video quality in case of video packet loss are:

a) The amount of lost packets
b) The packet loss distribution, which can, for example, be described in terms of the average number of lost packets in a given loss burst, and the distribution of such bursts.
c) The GOP-structure, including
　i) The GOP-length, i.e., the distance between frames which do not require previous or further frames to be decoded, the so-called 'key-frames' or "I-frames". One Group of Picture covers one I-frame and all frames till the next I-frame of the video sequence.
　ii) The number and repartition of B- and P-frames in each GOP, that is predicted (P-) and bidirectional (B-) frames.
　iii) The GOP "type": open-GOP or closed-GOP; when the GOP is open, frames belonging to one GOP may be encoded using reference frames from the following or previous GOP; when the GOP is closed, only reference frames from the current GOP can be used as reference for encoding frames of the current GOP.
d) The frame type of the frame impaired by packet loss. If the loss occurs in an I-frame or a P-frame, the loss is propagated to all frames referencing the impaired frame, typically till the next (reference) I-frame, while if the loss occurs in a B-frame, the loss is not propagated, except in the case of hierarchical B-frame coding. In case of hierarchical coding, some of the B-frames are also used as reference frames for other B-frames. Loss in reference B-frames are thus propagated to the dependent B-frames.
e) The number of packets per frame. This number depends on the bitrate and on the spatio-temporal complexity of the video. The higher the bitrate, the more packets are required to transmit the frame. The spatio-temporal complexity of the video influences the distribution of packets among frames: basically, the higher the spatial complexity of the video is, the more packets are required for I-frames or P- and B-frames (if spatially/intra predicted macroblocks are required to capture the information), and the higher the temporal complexity of the video is, the more packets are required to transmit P- and B-frames. In turn, the higher the number of packets per frame, the lower the corresponding amount of pixels contained in the packet. Considering a certain loss probability, the more packets a frame contains, the higher will be the probability of having packet loss in this frame, and the higher will be the probability that the loss propagates if this frame is a reference frame.
f) The packet-loss-concealment, i.e. the strategy implemented in the decoder for concealing the loss. Packet-loss-concealment can coarsely be categorized in terms of slicing or freezing. A slice is defined as an area of the video frame which can decoded independently. Thus, if it is affected by a packet loss—the decoder fills this area with data from (spatially or temporally) neighbouring correctly received areas. Slicing needs to be implemented by the encoder which introduces the slice-headers the decoder will use as synchronization-points. In case of packet loss and freezing-type loss concealment, the last correctly received video frame is repeated typically until the next intact I-frame arrives, or another intact reference frame the affected frame is predicted from In broadcast-services, freezing includes skipping the erroneous frames. In non-broadcast services, lost packets may be resent and played out even after a delayed reception. This can be considered as a re-buffering, and the missing information is not skipped. Note that the latter case is not considered by this invention.

g) If slicing is used as packet-loss-concealment, the number of slices per frame (see FIG. 2). The number of slices per frame is selected at the encoder stage. In case of packet loss and if slicing is used as packet-loss-concealment, this number influences the spatial extent of the loss. Indeed, if a packet loss occurs in a slice, the loss is propagated till the next slice, i.e. till the decoder can resynchronize based on the next available slice header. As a consequence, increasing the number of slices per frame reduces the spatial extent of the loss. However, this also increases the number of slice headers, and thus decreases the encoding efficiency at a given overall bitrate. This reflects that a trade-off exists between coding efficiency and robustness to packet-loss.

h) The rate control type employed by the encoder, that is, constant versus variable bitrate coding. Specifically, the type of rate control (constant or variable bitrate coding) employed by the encoder together with the spatio-temporal complexity of the content strongly affects the mapping of the spatio-temporal information into bytes or, in other terms, the number of packets required for a given spatio-temporal area. Note that the present invention targets both the case of constant and variable bitrate coding, but due to the reduced validity of estimating the spatio-temporal extend of loss events based on header information in strongly variable bitrate coding cases, the quality predictions provided by the technical user model described in this invention will be less close to the actual perception.

Quality estimation methods commonly support a separate estimation of the quality related with the coding (compression, Qcod) of the video signal, and the quality due to packet loss during transmission (Qtrans). Quality estimation methods commonly use one of two approaches to combine an estimation concerning the quality of the compression and the transmission quality. Equation (1) and (2) illustrate the two different approaches, where the respective value-ranges represent exemplary implementations:

$$Q=Q0-Qcod-Qtrans, Q0, Qx \in [0 \ldots 100] \quad (1)$$

$$Q=Q0*Qcod*Qtrans, Q0, Qx \in [0 \ldots 1] \quad (2),$$

Here, Q0 represents the base quality, or a function of the base quality. Base quality here refers to the perceived quality of the video before encoding, transmission and decoding.

Quality due to packet loss (Qtrans) is commonly estimated from the bit-rate and packet-loss-rate, as in [4]. For taking into account the packet-loss-distribution, parameters describing the repartition of loss within the video sequence, such as the burst density and burst duration as in [5] or the number of packets lost in a row as in [6] are also considered. Alternatively, parameters describing the packet loss frequency (i.e. number of packet-loss events within a given time period) as in [7] have been proposed. Those parameters are helpful in case of network planning but may be insufficient in case of service monitoring. For example, they do not capture which proportion of the hit frame is impaired, since they do not consider the total number of packets and the number of loss packets in the frame hit by loss. They are thus blind to the actual spatial extent of the loss. In addition, they do not consider the frame type of the frame hit by loss, and are thus blind to the temporal propagation and thus duration of the loss.

A parameter describing the temporal duration of the loss has been proposed in [8], but this parameter covers only freezing as packet-loss-concealment. An interesting proposal has been made in [10] for estimating the area in a frame that is affected by a loss in the case that slicing is applied. Here, the proposed approach is not applied to quality prediction as it is suggested in the present invention, and only covers one of the several sub-cases the present invention handles. In [9], a method is proposed using an approach similar to [10] but in a somewhat different context. It uses parameters that describe the spatial extent of the loss per frame and frame type and computes the quality of the frame based on those parameters. The frame timing and loss propagation are however not explicitly considered in terms of one single parameter for describing the loss-induced distortion.

Nevertheless, a perceptually adequate user model needs to use a quantitative mapping between the description of the loss and the quality impact in terms of the amount of perceptual degradation. In the model of the invention, it is assumed that the combination of the spatial extent and of the duration of the loss impacts the perceived quality. As a consequence, the invention defines a parameter that accurately and explicitly describes the spatial extent and the duration of the loss and a model that maps this parameter to the quality of the video sequence accounting for the given measurement window.

SUMMARY

In an embodiment, the present invention provides a method for assessing the quality of a transmitted video signal sequence at the receiver side. The method includes the steps of: capturing the received input video bit stream prior to decoding and supplying it to a video bit stream analyzer; extracting, during a measurement time window, one or more features from the captured packet headers by the bit stream analyzer, without analyzing or decoding the packet payload; computing from the one or more features, a single parameter, xwpSEQ, representing an estimate of the spatio-temporal extent of the signal degradation due to packet-loss, wherein the single parameter, xwpSEQ, is based on the number (N) of Group of Pictures (GOPs) in the measurement window and the spatio-temporal extent (xl_k) of the losses occurring in the affected Group of Pictures (k) using the relation xwpSEQ=Σxl_k/N, wherein the spatio-temporal extent (xl_k) of the losses occurring in a Group of Picture (k) is calculated based on the proportion of impaired pixels in the hit frame due to a loss event (xl_i), the loss location relative to the start of the GOP (t_i), and the length of the GOP (T_k) using the relation xl_k=Σxl_i−Σxl_i*t_i/T_k, wherein the computing additionally takes into account a correcting factor ($\alpha_{1,k}$) representing the spatio-temporal complexity of the video sequence, by which the contribution xl_k of the losses in GOP k to the overall parameter xwpSEQ is corrected, using the relation xwpSEQ=Σ$\alpha_{1,k}$*xl_k/N or xwpSEQ=Σ$\alpha_{1,k}$*xl_k*T_k/ΣT_k, where N is the number of GOPs in the measurement window and T_k is the length of GOP k; supplying the determined parameter to a quality estimation module; and calculating, by the quality estimation module, a quality measure due to packet loss ($Q_{trans}$) based on the single parameter representing the estimate of the spatio-temporal extent of the signal degradation, xwpSEQ, due to packet-loss and based on video resolution information and employed video codec.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 8:
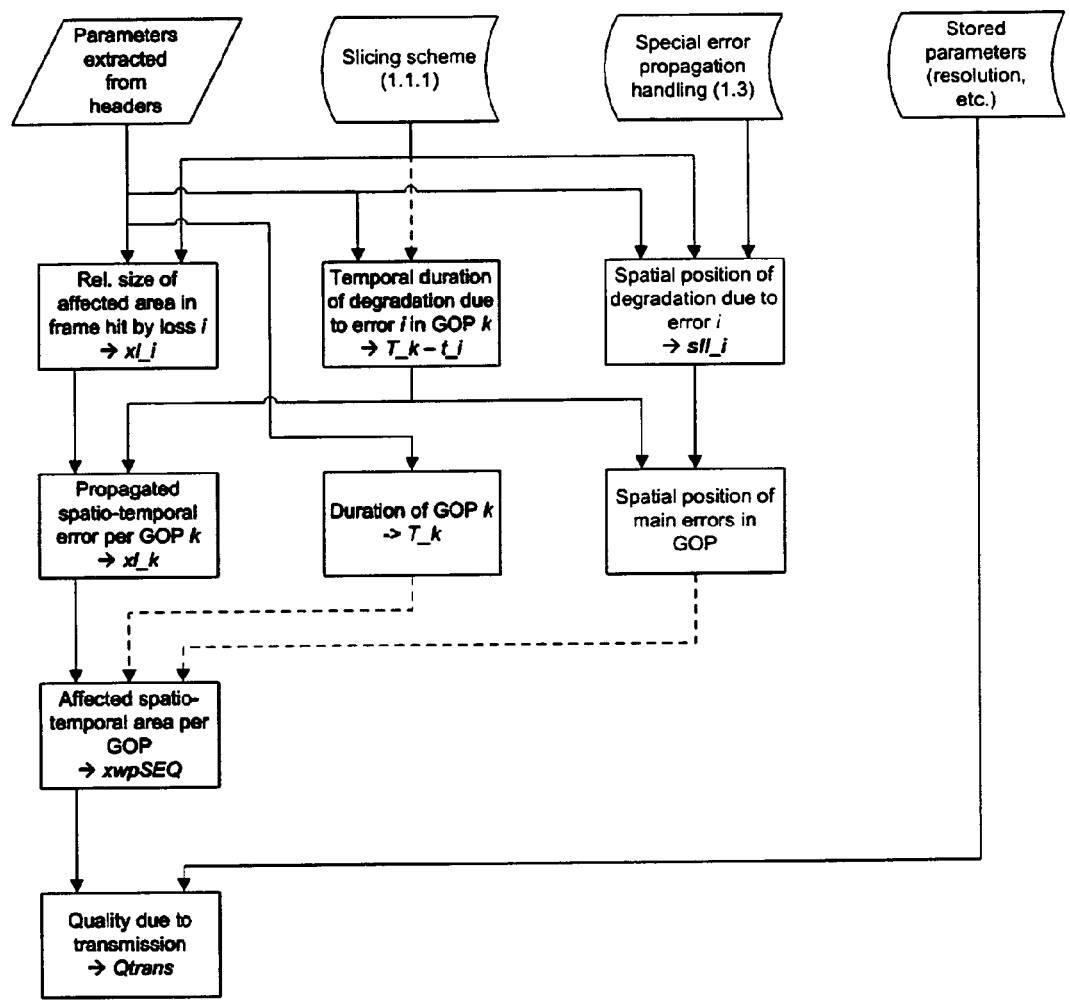
FIG. 8 summarizes the main steps of the invention by means of a flow-chart. The flow-chart illustrates the method for the example of determining Qtrans in the case that slicing is used as packet loss concealment. Note that the blocks with grey filling together form the basic mode of the patent. The white blocks reflect optional additional steps.

In an embodiment, the method of the invention focuses on the quality estimation of the term characterizing the transmission efficiency Qtrans in case slicing or freezing is applied as packet-loss-concealment. This method may be combined with different methods for quality estimation related with compression in video streams Qcod. The steps involved when applying the method for determining Qtrans in the case of slicing is illustrated using the flow-chart shown in FIG. 8.

Figure 1:
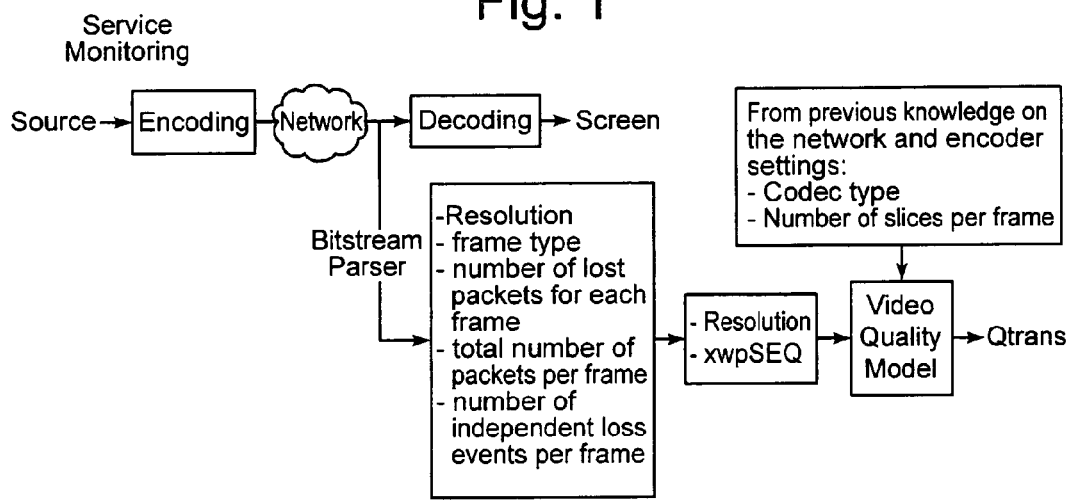
FIG. 1 shows a block diagram of the general framework of the estimation of quality related to compression and transmission distortions; In particular, it shows the general framework for estimating the perceived video quality in case of compression (Qcod) and transmission (Qtrans) degradations in case of service monitoring. Parameters such as the number of lost packets and the frame type, etc. are extracted from the bitstream and used for computing the xwpSEQ parameter, and predicting the quality impact due to packet loss Qtrans.
Figure 2:
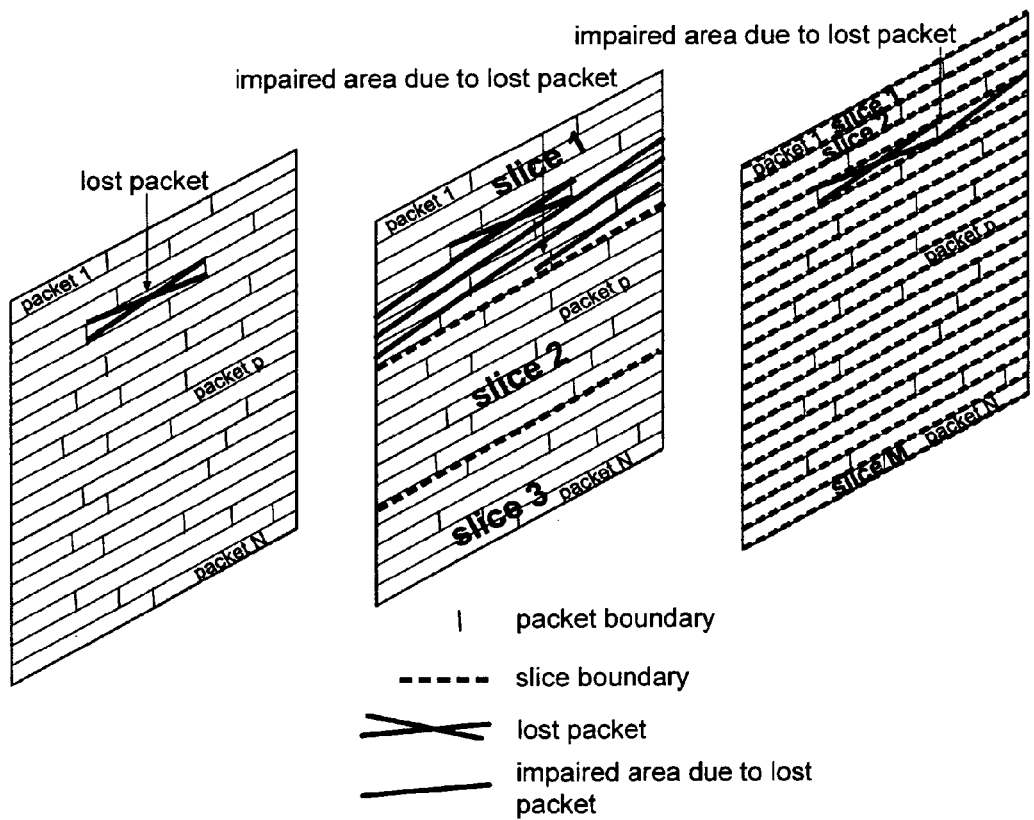
FIG. 2 shows the impact of the number of slices per frame in case of packet loss and slicing as packet loss concealment; in particular, it shows how the loss propagates till the next slice in a given frame, in case of 3-slices per frame (middle picture) and in case of 1 slice per Macroblock-row (right). A macro-block is a 16×16 pixels block. Different areas are effected depending on how many packets a frame is composed of, and on how many slices are used for the frame.

In an embodiment, the method of the invention is a parameter-based video quality model with light-weight parameters, and thus provides a technical solution suitable for service monitoring that can be implemented, for example, in end-user devices such as set-top boxes or home gateways. As shown in FIG. 1, as input the model takes parameters extracted from the bitstream. In principle, the measurement system in which the method is embedded can be placed at different locations in the network. However, the closer to the user device the probe is located, the more representative of the actual quality at the user side is the predicted quality. The parameters do not require access to the payload, and therefore do not require either a partial- or full-decoding of the bitstream. As a consequence, the method can be used for quality prediction for encrypted streams, where no access to the payload is possible at the measurement location in the network. A light-weight parsing of the packet headers is sufficient for accessing the parameters to be sent to the model. Note that if deeper parsing is allowed, as with un-encrypted data, the parameters can also be used in isolation or together with additional parameters extracted from the bit-stream based on partial or full-decoding.

In an embodiment, the method of the invention considers the parameters of the transmission process in detail. In the "Background" section, a list of elements are enumerated, such elements influencing the perceived video quality in case of packet loss. Those elements are also suitable for describing the quality impact due to packet loss, and thus may be used in terms of input parameters of a parameter-based video quality model. However, the corresponding list of parameters is long, reducing the flexibility of such a model, since the parameters must be adjusted each time the encoder settings, the packet-loss distribution or the GOP-structure are changed, which increases the risk of generating incorrect quality predictions.

With embodiments of the present invention, an alternative parameter is introduced, which reduces the number of input parameters to be used in a quality model significantly. This single parameter implements a more generic description of the spatial extent and duration of the loss than is possible based on the respective parameters normally used.

Embodiments of the invention provide a method and apparatus for assessing at the receiver side the quality of a transmitted video signal sequence over a link that introduces packet-losses, and in case that slicing or freezing is applied as packet-loss-concealment (Qtrans in equations (1) or (2)). These embodiments use one single parameter, which captures the magnitude of degradation, which is mapped to quality.

According to a first aspect, an embodiment of the invention provides a method for assessing the quality of a transmitted video signal sequence at the receiver side, the method comprising the steps of:

a) capturing the received input video bit stream prior to decoding and supplying it to a video bit stream analyzer;

b) extracting, during a measurement time window, one or more features from the packet headers of the captured input video bit stream by the bit stream analyzer;

c) determining from the one or more features, and optionally from meta-information known about the media stream such as the slicing configuration, a single parameter, xwpSEQ, representing the magnitude of signal degradation due to packet-loss;

d) supplying the determined parameter to a quality estimation module; and e) calculating, by the quality estimation module, a quality measure due to packet loss, $Q_{trans}$, based on the single parameter representing the magnitude of signal degradation, xwpSEQ, due to packet-loss and based on video resolution information and employed video codec.

The single parameter, xwpSEQ, determined in step c) represents the spatial extent and duration of loss. Preferably, the single parameter, xwpSEQ, is based on the number; N, of Group of Pictures, GOPs, in the measurement window and the spatio-temporal extent, xl_k, of the losses occurring in the affected Group of Pictures, k.

The spatio-temporal extent, xl_k, of the losses occurring in a Group of Picture, k, may be calculated based on the proportion of impaired pixels in the hit frame due to a loss event, xl_i, the loss location relative to the start of the GOP, t_i and the length of the GOP, T_k.

The proportion of impaired pixels in the hit frame, xl_i, is preferably calculated based on the number of video packets lost for packet loss event i in the current hit frame divided by the number of lost and correctly received packets in the current hit frame.

The proportion of impaired pixels in the hit frame, xl_i, may also be calculated based on the number of bytes of video lost due to the loss event i in the current hit frame divided by the number of lost and correctly received bytes in the current hit frame.

According to another embodiment, the proportion of impaired pixels in the hit frame, xl_i, is calculated based on the number of packets that contain the current frame, the number of lost video packets in the current hit frame that are lost in loss event i, the number of slices per frame, and the estimated number of packets per slice.

It is also preferred that the proportion of impaired pixels in the hit frame, xl_i, is calculated based on the total size in bytes of the packets that contain the current frame, the number of video bytes lost due to loss event i in the current hit frame, and the estimated number of packets or bytes per slice.

Alternatively, the proportion of impaired pixels in the hit frame, xl_i, is calculated based on the number of packets that contain the current frame, the number of video packets that belong to a combined loss event ij, in case that two or more loss events occur in that frame, the number of video packets in the current hit frame that are found during loss event ij, the number of slices per frame, and the estimated number of packets per slice.

The method also encompasses an alternative where the proportion of impaired pixels in the hit frame, xl_i, is calculated based on the number of video transport stream-packets lost in consecution, the number of slices per frame, and a correction term reflecting the loss propagation in the frame hit by loss.

In a still further embodiment, the proportion of impaired pixels in the hit frame, xl_i, is calculated based on the number of video bytes in the transport stream packets lost in consecution, and the total number of video bytes contained in the current hit frame.

Alternatively, the proportion of impaired pixels in the hit frame, xl_i, is calculated based on the number of video transport stream packets that belong to the combined loss event ij, the number of found video transport stream packets between the loss-part of a combined loss event i,j, the number of slices per frame, and a correction term reflecting the loss propagation in the frame hit by loss.

An alternative embodiment handles the case that one slice is used per frame. Here, the contribution xl_i of a loss event i is preferably calculated as the spatial area between the first lost packet and the end of the frame.

The method may in step (c) additionally take into account a correcting factor representing the spatio-temporal complexity of the video sequence, by which the contribution xl_i of the respective loss event i to the overall parameter is corrected. The correction factor preferably depends on the temporal complexity of the video computed per Group of Picture. Alternatively, the correction factor depends on the temporal location of the frame in the Group of Picture hit by loss event i. Furthermore, the correction factor may depend on the temporal location of the frame in the Group of Picture hit by loss event i and on the temporal complexity of the video calculated per Group of Picture.

In an embodiment of the invention, step e) may additionally take into account the number of Group of Pictures with loss events.

It is furthermore preferred that a variable is stored per loss event which captures an estimated position of the affected area in the respective frame, and is used for correcting the contribution xl_i of a loss event i, or for correcting the contributions of a given temporal portion of the sequence to the overall parameter according to step c).

According to a preferred embodiment, in case that freezing is used as packet-loss concealment type, the parameter according to step c) refers to the total weighted temporal duration of the freezings in the sequence, calculated according to any of the methods according to embodiments of the invention.

According to a second aspect, an embodiment of the invention provides an apparatus for assessing the quality of a transmitted video signal sequence at the receiver side, comprising:

a video bit stream analyzer capturing the received input video bit stream prior to decoding, and configured to extract, during a measurement time window, one or more features from the packet headers of the captured input video bit stream;

a determination unit for determining from the one or more features, and optionally from meta-information known about the media stream such as the slicing configuration, a single parameter, xwpSEQ, representing the magnitude of signal degradation due to packet-loss;

a quality estimation module configured to receive the determined parameter, the quality estimation module being configured to calculate a quality measure due to packet loss, $Q_{trans}$, based on the single parameter representing the magnitude of signal degradation, xwpSEQ, due to packet-loss and based on video resolution information and employed video codec.

The above-mentioned preferred embodiments of the first aspect are also preferred embodiments of the second aspect.

1. Slicing
1.1 Spatial-Temporal Extent xl_k of Loss-Degradation Per GOP k and Per Sequence (xwpSEQ)
An embodiment of the invention is first described for slicing. An embodiment for freezing is later presented as a sub-case of the method for slicing.

The spatial extent and duration of the loss are computed from the number of consecutively lost packets in the hit frames, the number of packets in the hit frames, the number of slices per frame, and the frame type of the hit frames.

Thus, Qtrans can be written as in equation (3).

Figure 3:
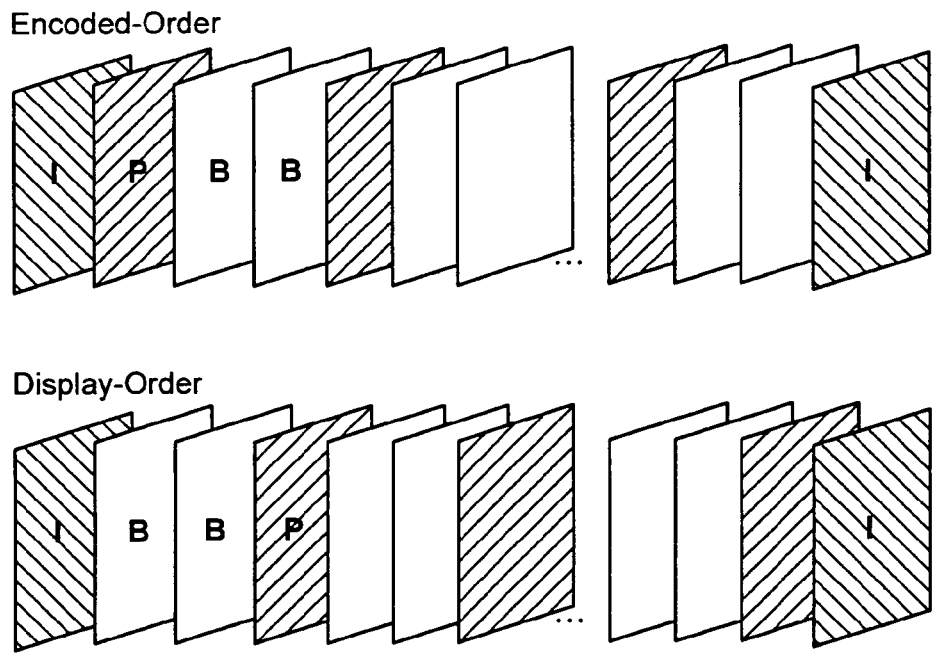
FIG. 3 compares the encoded-order of the video stream vs. the display-order.

Note that in the following, all the calculations are performed on the bitstream at the decoder input level, thus the frames follow the encoded-order, not the display-order (see FIG. 3).

$$Q\text{trans} = f(xwp\text{SEQ}) \quad (3)$$

in which
f . . . is for instance a logarithmic function
and $$xwp\text{SEQ} = \Sigma xl\_k/N \quad (4)$$

Figure 4:
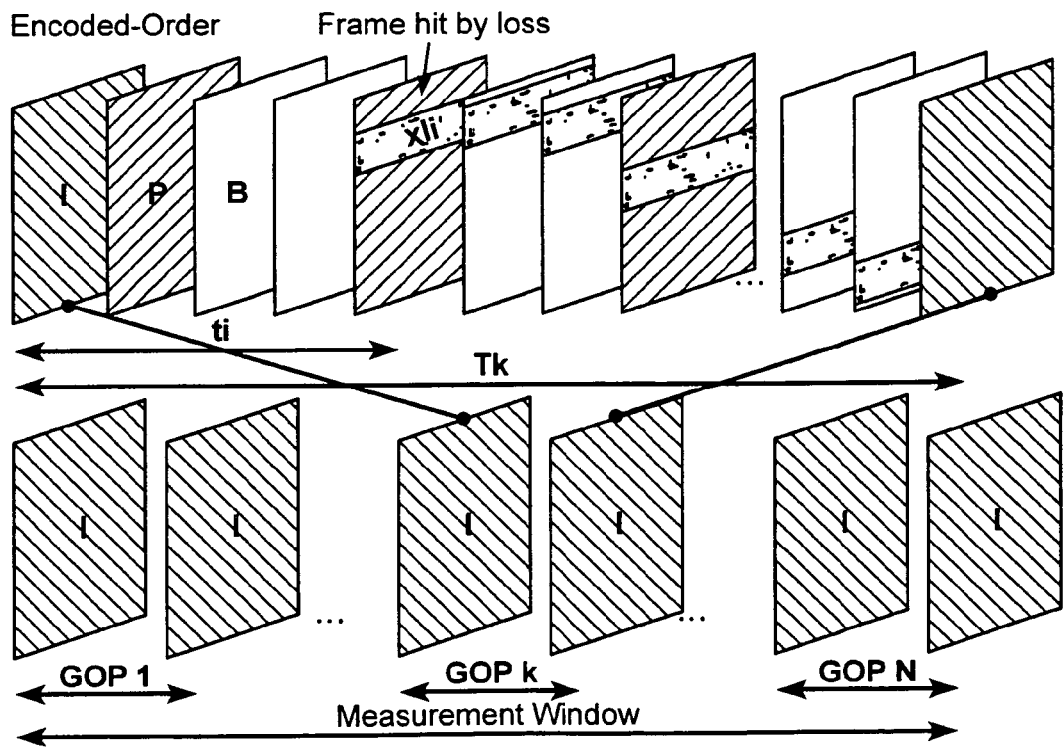
FIG. 4 illustrates the computation of the xwpSEQ parameter. It shows video frames within a measurement window and loss in GOP k.

(see also FIG. 4 for an illustration of the computation of xwpSEQ)
where
N . . . is the number of GOPs in the measurement window
xl_k is the spatio-temporal extent of the losses occurring in GOP k
and $$xl\_k = \Sigma xl\_i - \Sigma xl\_i * t\_i/T\_k \quad (5)$$

where
i . . . is the index of a new loss event (i.e. not resulting from loss propagation); if the loss event occurs in a B-frame (non-reference B-frame in case of hierarchical coding), the loss does not propagate, thus the loss event is ignored in the computation of xl_k.
t_i . . . is the index of the frame (relative to the GOP start) in which the new loss event occurs.
T_k . . . is the duration or length of GOP k, typically expressed in terms of number of frames.
xl_i . . . is the proportion of impaired pixels in the hit frame due to loss event i Let xl_i$_i$ be the individual contribution from loss event i, and xl_i$_w$ the contribution from any previous loss events w<i. Since in principle $$xl\_i_i + \sum_{w=1}^{i-1} xl\_i_w$$

for several loss events in one GOP k may become larger than 1, the sum in Equation (5) can be calculated in a step-wise manner, with $$xl\_k_i = \min\left(1, xl\_i_i + \sum_{w=1}^{i-1} xl\_i_w\right) \quad (5a)$$

where xl_k$_i$ is the accumulated relative spatial area up to the current loss event i in GOP k.

In an alternative embodiment and for the case of strongly differing GOP-lengths, the duration of each GOP can explicitly be considered in Equation (4), yielding (5a):

$$xwp\text{SEQ} = \Sigma xl\_k * T\_k / \Sigma T\_k \quad (5a2)$$

Here, T$_k$ is the overall duration of the sequence, which can, for example, be expressed by the number of frames.

Another embodiment of the invention is valid for the case that hierarchical B-frames are being used. In this case, a loss event in a reference B-frame can be assumed to propagate until the next intact P-frame arrives, while the loss affects both the B-frames that follow and precede the respective B-frame. As a consequence, the individual contributions xl_i from each loss event i are collected in a vector xl_k, where each entry characterizes the spatial extent of each loss event, and the respective durations are collected in a vector t_k.

$$xl\_k = (xl\_1, xl\_2, \ldots, xl\_n)', \quad (5b)$$
and $$t\_k(i, 1) = \begin{cases} T\_k - t\_i & \text{for loss in } P\text{-frame} \\ Tp\_i - t\_i & \text{for loss in } B\text{-reference frame} \end{cases} \quad (5b2)$$

where Tp_i is the frame location in GOP k of the P-frame following the reference B-frame hit by the loss. Here, frame-indexing in transmission order is assumed.

Then, the calculation of xl_k according to Equations (5) or (5a) involves the skalar product of the vectors xl_k and t_k:

$$xl\_k = 1/Tk \cdot (xl\_k \cdot t\_k) \quad (5c)$$

or following the same argumentation as provided above, limiting the spatial innovation error due to a new loss event i in a frame already affected by a loss or its propagation in such a way, that at most the whole frame is affected, see e.g. Equation (5a).

1.1.1 Determination of Contribution xl_i to Spattio-Temporal Extent of Loss Event i
1.1.1.1 One Slice Per Packet There are different ways for determining an estimated proportion of impaired pixels xl_i, depending on the employed packetization scheme.

For example the parameter xl_i can be computed as:

$$xl\_i = nlp\_i / np \quad (6)$$

where
nlp_i . . . is the number of video packets lost for packet loss event i in the current hit frame.
np . . . is the number of (lost+correctly received) packets in the current hit frame
xl_i . . . is the estimated proportion of impaired pixels in the current hit frame, corresponding to the packets lost in loss event i.

This embodiment represents the case that the packetization is done in such a way that one IP-packet contains exactly one slice (i.e. one Network Abstraction Layer Unit, NALU, in case of the H.264 video codec). In this case, the slices are typically chosen to correspond to the network MTU-size in bytes. Consequently, a packet loss corresponds to a slice loss, and a loss of nlp packets corresponds to the loss of nlp slices. In this case, the area affected by a loss is computed as the number of lost packets divided by the number of packets the frame is composed of. It is obvious that the number of packets the frame is composed of corresponds to the number of lost packets plus the number of received packets.

According to an alternative embodiment, the lost area in a reference frame can be estimated as the estimated number of bytes lost divided by the estimated number of bytes required for the given frame, as described in [10]:

$$xl\_i = blp\_i / bp \quad (6a)$$

in which
blp_i . . . is the number of bytes of video lost due to the loss event i in the current hit frame.
bp . . . is the number of (lost+correctly received) bytes in the current hit frame xl_i ... is the estimated proportion of impaired pixels in the current hit frame corresponding to the bytes lost with loss event i.

1.1.1.2 Fixed Number of Slices Per Frame, No Transport Streams

Next, the case will be considered that packetization is done in such a way that slices contain a fixed amount of pixels. This is the case, for example, for IP/UDP/RTP-based transmission with slices that are not forced to map to the MTU-size. It is assumed that nlp_i packets are lost in a row in a given loss event i hitting the current frame. Two cases can be distinguished: a) The packet size is larger than the slice size, b) the packet size is equal to or smaller than the size of a slice, since packetization otherwise is expected to yield packets of size (packet)=min(MTU,slice). In case a), it can be assumed that an integer number of slices are contained in each packet, and slice fragmentation will not be performed. This case a) is conceptually very similar to the previous descriptions, where there was one slice per packet. Similarly, in the present case a) of an integer number of slices contained in one packet, the relative amount of pixels lost with a loss event i corresponds to the relative number of packets $nlp_i$ lost divided by the number of packets the entire frame is composed of, see Equations (6) and (6a).

Figure 6:
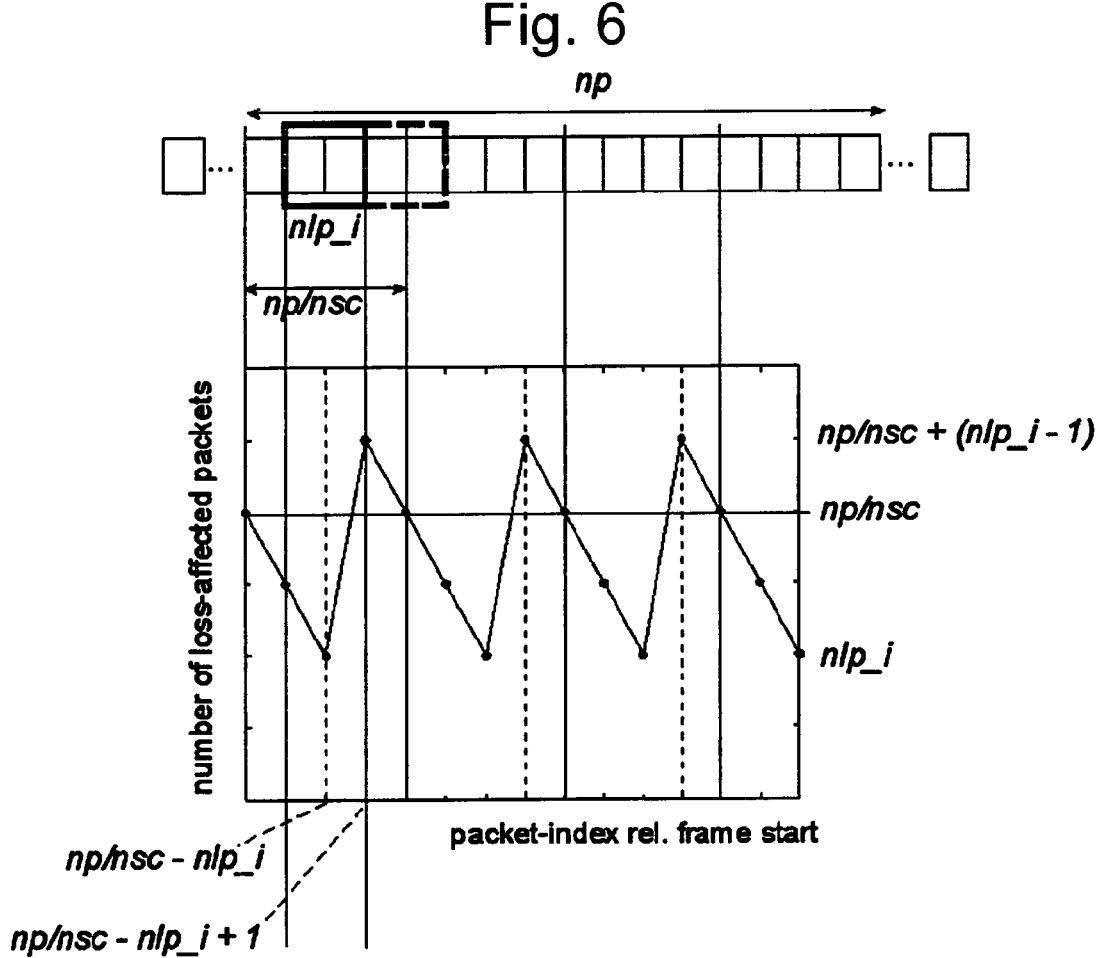
FIG. 6 illustrates how xl_i, the spatio-temporal extent of the loss event i, can be calculated for the case of slice fragmentation for the example of nlp_i=2 packets lost in a row, and four packets required for transmitting one slice. Note that for the upper picture, all slices for the frame are depicted one aside the other in terms of the packets they are composed of. Further, note that for illustration purposes an idealized situation is assumed with equal number of packets per slice for the entire frame.

In case b), with slice fragmentation, Equation (6) needs to be rewritten as $$xl\_i = 1/np * [(nlp\_i - 1) + (np/nsc + 1)/2] \quad (6b)$$

where np ... is the number of packets that contain the current frame nlp_i ... is the number of lost video packets in the current hit frame that are lost in loss event i, as previously.

nsc ... is the number of slices per frame np/nsc ... is the estimated number of packets per slice This case is illustrated in FIG. 6. The schematic drawing shows the proportion of spatial area that is affected by a loss event with nlp_i packets lost in a row as a function of the position of the loss relative to an example slice structure. Equation (6b), and similarly other equations in this patent, can be derived by calculating an average behaviour.

In an alternative embodiment of this case, instead of taking the numbers of packets, the respective numbers of bytes contained in these packets can be used, as in the previous case, see Equations (6) and (6a). Then:

$$xl\_i = 1/bp * [(blp - 1) + (np/nsc + 1)/2] \quad (6c)$$

where bp ... is the total size in bytes of the packets that contain the current frame blp_i ... is the number of video bytes lost due to loss event i in the current hit frame.

np/nsc ... the estimated number of packets per slice

If only one slice is used per frame, the exact placement of a loss event in that frame may be known. In this case, xl_i corresponds to the spatial area between the first lost packet and the end of the frame:

$$xl\_i = sap\_i / sf \quad (6d)$$

where sap_i is the surface affected by loss and sf the entire frame surface.

It is obvious for a person skilled in the art to calculate sap_i and sf based on packet sizes and/or payload sizes as it has been explained earlier in this patent.

It must be noted that only when the first lost packets p_i and p_j of two subsequent loss events i and j are separated by a gap_l_ij≥np/nsc, that is a number of packets greater or equal to the estimated number of packets required for a slice, the two loss-events are considered as subsequent. Otherwise, the two loss events are here treated as part of one single combined loss event ij that is characterized by a number of nfp_ij packets found in between. In this case, (6b) becomes:

$$xl\_i = 1/np * \{[(nlp\_ij - 1) + (np/nsc + 1)/2] - [nfp\_ij * (nfp\_ij + 1)/2]\} \quad (6e)$$

where np ... is the number of packets that contain the current frame nlp_ij ... is the number of video packets that belong to the combined loss event ij, that is all lost packets as well as the found packets in the gap included between the two packet loss events i and j (in the current hit frame).

nfp_ij ... is the number of video packets in the current hit frame that are found during loss event ij. Here, the combined loss event is of the form 1 ... 0.0 ... 1, with 1 corresponding to a lost packet, and 0 corresponding to a found packet. Thus the loss event starts and ends with a loss, with nfp_ij packets found in between nsc ... is the number of slices per frame np/nsc ... is the estimated number of packets per slice (6e) can also be expressed in terms of the size in bytes of the respectively lost and found parts of a video frame.

1.1.1.3 Fixed Number of Slices Per Frame, with Transport Streams

In case that the packetization involves Transport-Stream (TS) packets, video packets correspond to TS-packets with video payload. In this case, each slice typically corresponds to a fixed spatial area in the respective video frame, as in the previous case. Here, too, one to several packets may be required to transmit the respective slice, depending on the spatial or temporal complexity of the video for the given frame.

As mentioned in point g) of the "Background" section, if there is a loss event in a slice, the whole pixel-area from the pixel area corresponding to the lost packets till the next slice is impaired.

In this case, when there is a loss event i of nlp_i packets lost in a row, on average half-a-slice is lost in addition to the proportion of impaired pixels corresponding to the number of packets lost in event i in the hit frame. This can be reflected by modifying equation (6) to equation (7):

$$xl\_i = nlp\_i / np + 1/(2 * nsc) \quad (7)$$

where nlp_i ... is the number of video TS-packets lost in consecution nsc ... is the number of slices per frame 1/(2*nsc) ... is thus the correction term reflecting the loss propagation in the slice hit by loss.

Figure 7:
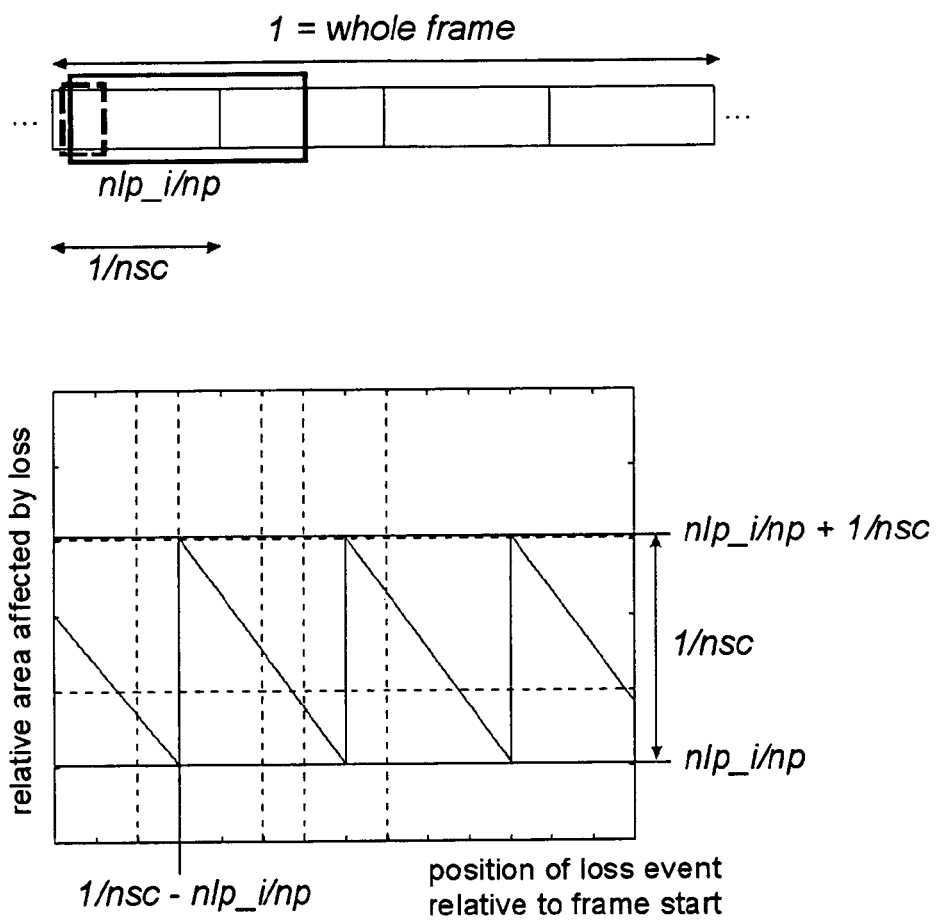
FIG. 7 details the computation of xl_i, the spatio-temporal extent of the loss event i, for the TS-case. A lost area can lie at an arbitrary position over the frame. Here, the lost area is expressed as the proportion relative to the entire frame size. The loss position is expressed in terms of the position of the start of the loss.

The situation is illustrated in FIG. 7, where the spatial area affected by a given loss event of nlp_i packets lost is shown as a function of how the loss event is positioned on the frame and relative to an example set of slices. Here, spatial proportions are expressed relative to the overall number of packets the frame is composed of, so that the entire frame corresponds to a proportion of 1. Equation (7) follows when calculating the area that is affected on average, integrating the shown curve over the start position of the loss event relative to the frame start. The given example is chosen for the case that the spatial area contained in the lost packets is smaller than one slice, but it can easily be shown that the same relations apply also when it is larger than one slice.

In an alternative embodiment, the packet sizes in bytes rather than the numbers of packets may be used:

$$xl\_i = blp\_i / bp + 1/(2 * nsc) \quad (7a)$$

where
blp_i ... is the number of video bytes in the TS-packets lost in consecution
bp ... is the total number of video bytes contained in the current hit frame As in other packetization cases, the start points of two loss events i and j may be less than one slice in bytes or number of TS-packets apart from each other. In this case, the invention suggests to consider the two loss events as one single loss event with a number nfp or size bfp of packets found in between the two series of lost packets nlp_i and nlp_j (or blp_i and blp_j, respectively). In this case, like in a comparable embodiment described previously, the nfp_i packets found in between the two loss runs will reduce the proportion of impaired pixels in the respective frame, as it can be described by (7b):

$$xl\_i = nlp\_ij/np + 1/(2*nsc) - nfp\_ij/(2*np) \quad (7b)$$

where in addition to the previous definitions we have
nlp_ij ... is the number of video TS-packets that belong to the combined loss event ij, including the packets being found in between (here assuming only one gap in between two loss events i,j).
nfp_ij ... is the number of found video TS-packets between the loss-part of a combined loss event i,j.
nsc ... is the number of slices per frame
1/(2*nsc) ... is thus the correction term reflecting the loss propagation in the slice hit by loss.

In the particular case that only few, that is, for example, one, two or three slices are used per frame, the calculation of xl_i may be more exact, when the position of a loss event i on the sequence of packets belonging to the frame is considered. This is particularly meaningful for the case of one slice per frame, where all pixel information following the lost packet in that frame can be considered as degraded. In that case, equation (7) becomes equation (7c):

$$xl\_i = ndp\_i/np \quad (7c)$$

where
ndp_i ... is the number of packets from the first lost packet in the frame till the end of the frame.

In general for the transport stream case, if the number of video packets lost with the loss event i exceeds an assumed number of packets belonging to the frame, or the area affected (as assumed, for example, from the estimated number of bytes being lost) exceeds the area of the frame, and thus the loss event extents to the next frame, a respective consideration of affected loss area for the next frame needs to be made. Such calculation can be made using, for example, equation (7), (7a), (7b) or (7c) on the affected (following) frame.

Other aspects of explicitly considering the location of loss in the frame are described in Section 1.3.2.

1.2 Quality Model

Now, for all of the above cases, following embodiments of the invention, we have for instance:

$$Q\text{trans} = a*\log(b*xwp\text{SEQ}+1) \quad (8)$$

In equation (8), the values of the coefficients a and b depend on the video resolution and employed video codec. For a given resolution and video codec, with only one set of coefficients the model covers various bitrates, video content types (in terms of spatio-temporal complexity), choices of GOP structure, packet loss rate and distribution and number of slices per frame.

Note that the coefficients are preferably obtained in a least-square-error curve fitting procedure using the ratings of perception tests as target values. We have for instance a=7.79 and b=0.002 for HD resolution (1920×1080 pixels) with the H.264 video codec corresponding to an x264 encoder implementation.

Figure 5:
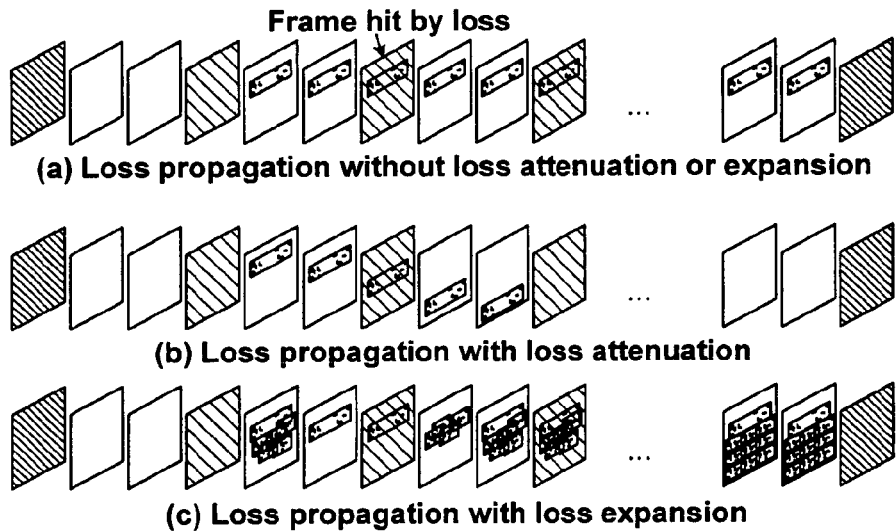
FIG. 5 shows different variants of loss propagation depending on the type of motion in a given GOP hit by packet loss. It shows an example of error propagation (a) without considering loss attenuation or expansion, (b) considering loss attenuation, and (c) considering loss expansion.

1.3 Model Refinements 1.3.1 Behaviour of the Loss-Affected Area During Error Propagation If one packet loss occurs on a reference P- or I-frame at time t_i in GOP k, the error is propagated till the next I-frame. The number of impaired pixels in the originally hit frame at time t_i and in the dependent frames till the next I-frame is so far considered constant. In other terms, the spatial extent of the loss is considered constant while propagating (see FIG. 5 (a)). This assumption is in most of the cases not accurate. Indeed, since there is movement in the video, and due to the nature of the encoding process, the spatial extent of the loss is changing from one dependent frame to another one (see FIGS. 5 (b) and (c)). The expansion (FIG. 5 (c)) or decrease (FIG. 5 (b)) of this spatial extent depends on the amount and temporal complexity of the movement. If the movement is chaotic, for example if different parts of the image move into different directions, the loss may propagate across the whole frame (FIG. 5 (c)), but if the movement of the impaired object is consistent and fast, the impaired object might disappear from the picture before the next I-frame (FIG. 5 (b)). This aspect can be adjusted by inserting a correcting factor $\alpha_{1,k}$ to xl_k in equation (4) and all related equations, and/or a correcting factor $\alpha_{2,i}$ to xl_i in equation (5) and all related equations, as shown in equations (9a), (9a2) and (9b):

$$xwp\text{SEQ} = \Sigma \alpha_{1,k}*xl\_k/N \quad (9a)$$

or related to Equation (5a)

$$xwp\text{SEQ} = \Sigma \alpha_{1,k}*xl\_k*T\_k/\Sigma T\_k \quad (9a2)$$

where $$xl\_k = \Sigma \alpha_{2,i}*xl\_i - \Sigma \alpha_{2,i}*xl\_i*t\_i/T \quad (9b)$$

The correcting factor $\alpha_{1,k}$ depends on the temporal complexity of the video tcomp. The temporal complexity is computed per GOP k.

The correcting factor $\alpha_{2,i}$ is applied per loss event xl_i and depends on the temporal location of the frame hit by loss event i, i.e. on t_i and on the temporal complexity of the video tcomp.

The correcting factors can thus be written as in equations (10a) and (10b).

$$\alpha_1 = g_1(t\text{comp}) \quad (10a)$$

$$\alpha_2 = g_2(t\_i, t\text{comp}) \quad (10b)$$

where
tcomp ... is the temporal complexity of the GOP, e.g. a function of the frame sizez for I, P- and B-frames,
and where
t_i ... is the frame position in the GOP in which the new loss event occurs.

Thus
$\alpha_1$ ... is a function of tcomp
$\alpha_2$ ... is a function of the frame location between t_i and T and of tcomp.

The correcting factors $\alpha_{1,k}$ and $\alpha_{2,i}$ may be obtained statistically in a previous stage (off-line) by comparing for each loss event and for a wide range of video contents the xl_i values computed using equation (6)—or any of the other equations provided above that enable calculating xl_i—and the actual number of impaired pixels. The actual number of impaired pixels is for instance calculated by comparing frame-by-frame the encoded video with packet loss and the packet-loss-free encoded video. This number is stored for each loss event together with the t_i, tcomp and xl_i values. We thus have a mapping between the actual number of impaired pixels and xl_i for various tcomp and t_i values that needs to be derived using heuristic approaches known to the person skilled in the art. We thus know how much) xl_i should be attenuated or expanded for each t_i and tcomp values.

Note that the visibility of the error depends on the spatio-temporal complexity of the content. For instance, for low temporal-complexity-contents and in case slicing is used as part of the packet-loss-concealment, this loss concealment may work very well, and the loss-induced error may not be visible. The error may also be non-visible when occurring in spatial areas with high amount of detail. As a consequence, in an alternative embodiment the factors $\alpha_{1,k}$ and $\alpha_{2,i}$ could also represent the visibility of the error to be calculated based on the temporal and spatial complexities of the video sequence. In this case, equations (9a) and (9a2) can be used, and the correcting factor $\alpha_{1,k}$ depends on the spatio-temporal complexity of the video stcomp. The spatio-temporal complexity is computed per GOP k, and equation (10a) becomes $$\alpha_1 = g_1(stcomp) \tag{10a2}$$

where stcomp . . . is the spatio-temporal complexity of the GOP, e.g. a function of the frame sizes for I-, P- and B-frames.

The features expressed by Equations (9a)-(10a2) can be combined with the slightly differing temporal integration of loss when hierarchical B-frame coding is employed, see, for example, Equations (5b2), and (5c).

1.3.2 Spatial Area Affected by Loss Event

Using the same weighting factors as introduced above, the position of the degradation in a frame caused by loss event i can explicitly be taken into consideration. This may be meaningful for different reasons:

I) The attention of the viewer is expected to be focused mainly on the middle of the frame. This effect is decreased by the occurrence of visible errors, which are likely to attract the viewer's attention. However, visible errors occurring in certain errors of the frame may yield a stronger impact on quality than errors in other areas of the frame. This aspect is well known; the invention made in this patent consists in how this effect can be included in the calculation of xl_k and xwpSEQ, using the factors $\alpha_1$ or $\alpha_2$ introduced above in an appropriate manner, using a representation of spatial location as it is outlined below.

II) When several loss events occur in similar spatial locations in one GOP, it is likely that the affected spatial area does not correspond to the accumulation of individual contributions from these loss events. Instead, it is likely that the impact is combined, and consequently the resulting xl_k for GOP k is lower than when all loss events affect different spatial areas. Since this effect interacts with the temporal complexity in the scene, that is will be less expressed when the degradation location moves around with the movements in the scene, an additional content-dependency exists. All these aspects can be handled by appropriately choosing the weighting factor $\alpha_2$ introduced above.

III) When several GOPs show degradations in similar spatial locations, as it is, for example, the case for video transmission with one slice per frame (due to the statistics, the lower part will always be more affected), it can be assumed that the resulting degradation will be different from the case that different GOPs are degraded in different spatial areas. For example, visual attention will be focused on re-occurring areas with loss, and hence the quality-impact very likely more prominent in this case. This effect can be modelled, for example, with an appropriate choice of the weighting factor $\alpha_1$.

For all of these cases (I)-(III), it is required to keep track of the spatial location of the degradation caused by a loss event i in frame j and the accumulated spatial location for the different GOPs k. Based on the same considerations as outlined in previous parts of the patent, it is obvious that the location can be tracked by using the distance of a loss event i from the start of frame j in terms of the vertical position in the frame, the overall size of the loss area relative to the total size (or spatial extent) of the frame, and thus the size of the area at the end of the frame that is not affected by the loss.

In one embodiment of the invention, the following approach is taken to keep track of degradation location due to losses in frame and GOP:

Let xl_i be the spatial extent of the area affected by loss event i, as above. We now further introduce the following proportions that are extracted from packet size or packet number information as above:

xfoundB_i is the relative spatial area at the beginning of the frame j, which is not affected by loss event i. Note that xfoundB_i can be equal to 0.

xfoundE_i is the relative spatial area at the end of the frame j, which is not affected by loss event i. Note that xfoundE_i can be equal to 0.

sll_i is a column-vector which contains, in each line, information about whether and, if desired, to which extend the respective part of the frame contains parts of loss event i. For this aim, the frame j is divided into M equally large horizontal lines, with M corresponding to the dimensionality of the vector sll_i.

Now, in one embodiment of the invention, the entries of the vector sll_i can be calculated as follows:

sB_i is the proportion in the beginning of the frame not affected by loss, in terms of the line-sampling into M lines, and expressed relative to the total frame size.

sE_i is the proportion at the end of the frame not affected by loss, in terms of the line-sampling into M lines, and expressed relative to the total frame size.

Further:

$$sB\_i = (\text{floor}(xfoundB\_i * M))/M \tag{10c}$$

$$sE\_i = (\text{floor}(xfoundE\_i * M))/M \tag{10d}$$

Then, for sll_i:

$$sll\_i(m) = \begin{cases} 0, & 0 \leq m \leq sB\_i \cdot M \\ 1/M - (xfoundB\_i - sB\_i), & sB\_i \cdot M < m \leq sB\_i \cdot M + 1 \\ 1, & sB\_i \cdot M + 1 < m \leq M - (sE\_i \cdot M + 1) \\ sE\_i + 1/M - xfoundE\_i, & M - (sE\_i \cdot M + 1) < m \leq M - sE\_i \cdot M \\ 0, & M - sE\_i \cdot M < m \end{cases} \tag{10e}$$

A simpler expression for (10e) is:

$$sll\_i(m) = \begin{cases} 0, & 0 \leq m \leq sB\_i \cdot M \\ c1, & sB\_i \cdot M < m \leq sB\_i \cdot M + 1 \\ 1, & sB\_i \cdot M + 1 < m \leq M - (sE\_i \cdot M + 1) \\ c1, & M - (sE\_i \cdot M + 1) < m \leq M - sE\_i \cdot M \\ 0, & M - sE\_i \cdot M < m \end{cases} \quad (10f)$$

with c1 being a constant chosen appropriately.

Now, the coefficients $\alpha_1$ and $\alpha_2$ can be calculated as functions of these vectors sll_i:

$$\alpha_1 = f(g(sll\_i_k)) \quad (10g)$$

$$\alpha_2 = h(sll\_i) \quad (10h)$$

Here, Equation (10h) can, for example, involve a summation of all sll_i for a given GOP k. Then, the distribution of values in the M bins described by sll_i can be a measure of whether different loss events i affecting a given GOP hit similar or dissimilar areas. Then, the lower the spread of values, the more the losses are concentrated in a certain area, yielding a lower weighting of individual events.

For Equation (10f), the summed $sll\_i_k$ for a given GOP k can be accumulated over GOPs, providing a measure of whether different or similar areas are affected for the different affected GOPs. Accordingly, the contribution of GOPs can be weighted higher or lower.

These methods can be combined with additional weighting-contributions in terms of the motion contained in the scene, or any other of the aspects that can be handled by an appropriate weighting, as described above.

1.3.3 Impact Due to Number of GOPs Affected

An additional way of improving the model prediction is to insert as input parameter the number of GOPs with loss events. Indeed, as can be seen in equation (4), the model does not distinguish so far the quality impact of a single long loss event with a large spatial extent from several shorter and smaller (in terms of spatial extent) loss events. We assume that several small loss events degrade the quality more than a single bigger loss event, but this difference depends on the spatial extent of the loss events themselves. As a consequence, we insert a correcting factor $\beta$ in equation (4), as shown in equation (11):

$$xwpSEQ = \Sigma \beta\_k * xl\_k / N \quad (11)$$

with $$\beta\_k = h(Ngl, xl\_k)$$

in which

Ngl . . . is the number of GOPs with loss events in the measurement window.

xl_k . . . is the spatio-temporal extent of the losses occurring in GOP k (see equations (5) and (9) and all related equations)

It can also be combined with the form of (4) that includes differently long GOPs as it is given in (5a), yielding (11a):

$$xwpSEQ = \Sigma \beta\_k * xl\_k * T\_k / \Sigma T\_k \quad (11a)$$

Similarly to $\alpha$, $\beta\_k$ may be obtained statistically in a previous stage by comparing the xwpSEQ values of a set of video sequences which obtained the same perceived quality and by storing for each xwpSEQ and perceived quality values the Ngl and xl_k parameters. Note that the perceived quality has been previously obtained by conducting subjective tests, since the invention can be considered as a technical model of the perception process of human subjects. The $\beta$ value is adjusted for obtaining the best mapping between xwpSEQ computed using equation (11) and the perceived quality.

2. Freezing

The method has so far been described assuming that slicing was used as packet-loss-concealment type. The xwpSEQ parameter is however also valid in case that freezing is used as packet-loss-concealment type if the GOPs of the measurement window have the same length. Indeed, and as mentioned in point f) in the "Background" section, in case of freezing, if a frame is hit by packet loss, the last unimpaired frame freezes till the next I-frame. The spatial extent of the loss described in the xwpSEQ does not hold, contrary to the temporal aspect of the loss covered by this parameter.

This can be reflected in equation (5) by forcing $\Sigma(xl\_i)$ to 1, (and reflecting Equation 5a), leading to equation (12):

$$xl\_k = 1 - t\_i / T\_k = (T\_k - ti) / T\_k \quad (12)$$

In equation (12), the xl_k represents the duration of the loss in the GOP relative to the duration of the GOP k.

When using (12) together with (4) or (5a) or any other of the related equations, both the case of equally long GOPs and differently long GOPs can be considered. Also, corrections of the freezing-related parameter in terms of the spatio-temporal complexity of the content can be implemented as in the case of slicing degradation as it is outlined in the previous sections.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

Furthermore, in the claims the word "comprising" does not exclude other elements or steps. A single unit may fulfil the functions of several features recited in the claims. Any reference signs in the claims should not be construed as limiting the scope.

[1] A.

The invention claimed is:

1. A method for assessing the quality of a transmitted video signal sequence at the receiver side, the method comprising the steps of:
   a) capturing the received input video bit stream prior to decoding and supplying it to a video bit stream analyzer;
   b) extracting, during a measurement time window, one or more features from the captured packet headers by the bit stream analyzer, without analyzing or decoding the packet payload;
   c) computing from the one or more features, a single parameter, xwpSEQ, representing an estimate of the spatio-temporal extent of the signal degradation due to packet-loss, wherein the single parameter, xwpSEQ, is based on the number (N) of Group of Pictures (GOPs) in the measurement window and the spatio-temporal extent (xl_k) of the losses occurring in the affected Group of Pictures (k), wherein the spatio-temporal extent (xl_k) of the losses occurring in a Group of Pictures (k) is calculated based on the proportion of impaired pixels in the hit frame due to a loss event (xl_i), the loss location relative to the start of the GOP (t_i), and the length of the GOP (T_k) using the relation xl_k=$\Sigma_i$xl_i−$\Sigma_i$xl_i*t_i/T_k, wherein the computing additionally takes into account a correcting factor ($\alpha_{1,k}$) representing the spatio-temporal complexity of the video sequence, by which the contribution xl_k of the losses in GOP k to the overall parameter xwpSEQ is corrected, using the relation xwpSEQ=$\Sigma_{k=1}^{N}\alpha_{1,k}$*xl_k/N or xwpSEQ=$\Sigma_{k=1}^{N}\alpha_{1,k}$*xl_k*T_k/$\Sigma_{k=1}^{N}$T_k, where N is the number of GOPs in the measurement window and T_k is the length of GOP k;

d) supplying the determined parameter to a quality estimation module; and e) calculating, by the quality estimation module, a quality measure due to packet loss ($Q_{trans}$) based on the single parameter representing the estimate of the spatio-temporal extent of the signal degradation, xwpSEQ, due to packet-loss and based on video resolution information and employed video codec.

2. The method of claim 1, wherein the single parameter, xwpSEQ, determined in step c) is also computed from meta-information about the media stream.

3. The method of claim 1, wherein the proportion of impaired pixels in the hit frame (xl_i) is calculated based on the number of video packets lost for packet loss event i in the current hit frame (nlp_i) divided by the number of lost and correctly received packets in the current hit frame (np) using the relation xl_i=nlp_i/np.

4. The method of claim 1, wherein the proportion of impaired pixels in the hit frame (xl_i) is calculated based on the number of bytes of video lost due to the loss event i in the current hit frame (blp_i) divided by the number of lost and correctly received bytes in the current hit frame (bp) using the relation xl_i=blp_i/bp.

5. The method of claim 1, wherein the proportion of impaired pixels in the hit frame (xl_i) is calculated based on the number of packets that contain the current frame (np), the number of lost video packets in the current hit frame that are lost in loss event i (nlp_i), the number of slices per frame (nsc), and the estimated number of packets per slice (np/nsc), using the relation xl_i=1/np*[(nlp_i−1)+(np/nsc+1)/2].

6. The method of claim 1, wherein the proportion of impaired pixels in the hit frame (xl_i) is calculated based on the total size in bytes of the packets that contain the current frame (bp), the number of video bytes lost due to loss event i in the current hit frame (blp_i), and the estimated number of packets or bytes per slice (np/nsc), using the relation xl_i=1/bp*[(blp_i−1)+(np/nsc+1)/2].

7. The method of claim 1, wherein the proportion of impaired pixels in the hit frame (xl_i) is calculated based on the number of packets that contain the current frame (np), the number of video packets that belong to the combined loss event ij (nlp_ij), the number of video packets in the current hit frame that are found during loss event ij (nfp_ij), the number of slices per frame (nsc), and the estimated number of packets per slice (np/nsc), using the relation xl_i=1/np*{[(nlp_ij−1)+(np/nsc+1)/2]−[nfp_ij*(nfp_ij+1)/2]}.

8. The method of claim 1, wherein the proportion of impaired pixels in the hit frame (xl_i) is calculated based on the number of video transport stream-packets lost in consecution (nlp_i), the number of slices per frame (nsc), and a correction term reflecting the loss propagation in the frame hit by loss, 1/(2*nsc), using the relation xl_i=nlp_i/np+1/(2*nsc).

9. The method of claim 1, wherein the proportion of impaired pixels in the hit frame (xl_i) is calculated based on the number of video bytes in the transport stream packets lost in consecution (blp_i), the total number of video bytes contained in the current hit frame (bp), the number of slices per frame (nsc), and a correction term reflecting the loss propagation in the frame hit by loss, 1/(2*nsc), using the relation xl_i=blp_i/bp+1/(2*nsc).

10. The method of claim 1, wherein the proportion of impaired pixels in the hit frame (xl_i) is calculated based on the number of video transport stream packets that belong to the combined loss event ij (nlp_ij), the number of found video transport stream packets between the loss-part of a combined loss event i,j (nfp_ij), the number of slices per frame (nsc), and a correction term reflecting the loss propagation in the frame hit by loss, 1/(2*nsc), using the relation xl_i=nlp_ij/np+1/(2*nsc)−nfp_ij/(2*np).

11. The method of claim 1, where in the case that one slice is used per frame the contribution xl_i of a loss event i is calculated as the spatial area between the first lost packet and the end of the frame.

12. The method of claim 1, wherein step (c) additionally takes into account a correcting factor, $\alpha_{2,i}$, representing the spatio-temporal complexity of the video sequence, by which the contribution xl_i of the respective loss event i located at frame t_i in GOP k, to the xl_k parameter is corrected, using the relation xl_k=$\Sigma\alpha_{2,i}$*xl_i−$\Sigma\alpha_{2,i}$*xl_i*t_i/T_k, where T_k is the length of GOP k.

13. The method of claim 1, wherein the correction factor depends on the temporal complexity of the video computed per Group of Picture.

14. The method of claim 1, wherein the correction factor depends on the temporal location of the frame in the Group of Picture hit by loss event i.

15. The method of claim 1, wherein the correction factor depends on the temporal location of the frame in the Group of Picture hit by loss event i and on the temporal complexity of the video calculated per Group of Picture.

16. The method of claim 1, wherein the correction factor depends on the spatio-temporal complexity of the video computed per Group of Picture.

17. The method of claim 1, wherein step e) additionally takes into account the number of Group of Pictures with loss events (Ngl), using the relations xwpSEQ=$\Sigma\beta$_k*xl_k/N, with $\beta$_k=h(Ngl,xl_k).

18. The method of claim 1, where a variable is stored per loss event which captures an estimated position of the affected area in the respective frame, and is used for correcting the contribution xl_i of a loss event i, or for correcting the contributions of a given temporal portion of the sequence to the overall parameter according to c).

19. The method of claim 1, wherein freezing is used as packet-loss concealment type, and the parameter c) refers to the total weighted temporal duration of the freezing events in the sequence, and using the relation xl_k=(T_k−t_i)/T_k, where t_i is the loss location relative to the start of the GOP, T_k is the length of the GOP k.

20. An apparatus for assessing the quality of a transmitted video signal sequence at the receiver side, comprising:
a video bit stream analyzer for capturing the received input video bit stream prior to decoding, and configured to extract, during a measurement time window, one or more features from the captured packet headers of the captured input video bit stream without analyzing or decoding the packet payload;

a determination unit for computing from the one or more features a single parameter, xwpSEQ, representing an estimate of the spatio-temporal extent of the signal degradation due to packet-loss, wherein the single parameter, xwpSEQ, is based on the number (N) of Group of Pictures (GOPs) in the measurement window and the spatio-temporal extent (xl_k) of the losses occurring in the affected Group of Pictures (k), wherein the spatio-temporal extent (xl_k) of the losses occurring in a Group of Pictures (k) is calculated based on the proportion of impaired pixels in the hit frame due to a loss event (xl_i), the loss location relative to the start of the GOP (t_i), and the length of the GOP (T_k) using the relation xl_k=$\Sigma_i$xl_i−$\Sigma_i$xl_i*t_i/T_k, wherein the computing additionally takes into account a correcting factor, $\alpha_{1,k}$, representing the spatio-temporal complexity of the video sequence, by which the contribution xl_k of the losses in GOP k to the overall parameter xwpSEQ is corrected, using the relation xwpSEQ=$\Sigma_{k=1}^{N}\alpha_{1,k}$*xl_k/N or xwpSEQ=$\Sigma_{k=1}^{N}\alpha_{1,k}$*xl_k*T$_{k/\Sigma k=1}^{N}$T_k, where N is the number of GOPs in the measurement window and T_k is the length of GOP k; and a quality estimation module configured to receive the determined parameter, the quality estimation module being configured to calculate a quality measure due to packet loss, $Q_{trans}$, based on the single parameter representing the estimate of the spatio-temporal extent of the signal degradation, xwpSEQ, due to packet-loss and based on video resolution information and employed video codec.

* * * * *